2,963,475
PROCESS FOR EXTRACTION OF ALKALOIDAL SUBSTANCE FROM PLANTS OF THE APOCYNACEAE FAMILY

Merrill Frederick Bartlett, Murray Hill, N.J., and Charles Meystre, Arlesheim, Switzerland, assignors to Ciba Pharmaceutical Products, Inc., Summit, N.J., a corporation of New Jersey No Drawing. Filed Feb. 26, 1958, Ser. No. 717,569

5 Claims. (Cl. 260—236)

This invention relates to a crystalline alkaloidal substance having valuable pharmacological activity and to process for the manufacture thereof.

According to the present invention the new compound is prepared in substantially pure form from plant material of certain Hunteria species, a plant of the Apocynaceae family, particularly from *Hunteria eburnea*. The new compound is advantageously prepared from the bark, especially from the stem bark.

The new compound melts with decomposition at 335–337° C. ($\pm 5°$ C., a margin of error, which is due to the high temperature); it analyzes for an empirical formula $C_{20-21}H_{25-29}O_{2-3}N_2Cl$. The halogen atom of this compound is ionically bound; this may be shown by dissolving the new compound in a 5 percent aqueous solution of nitric acid and adding a one percent aqueous solution of silver nitrate with the formation an insoluble precipitate of silver chloride, indicating the presence of an ionically bound chlorine atom.

It is soluble in 5 percent aqueous acetic acid, dilute aqueous sodium hydroxide, dilute aqueous ammonium hydroxide and dilute aqueous sodium hydrogen carbonate; partly soluble in hot water; somewhat less soluble in methanol; sparingly soluble in ethanol, and dilute aqueous hydrochloric acid. It is preferably crystallized from ethanol or acetone, or from aqueous mixtures thereof.

Its ultraviolet absorption spectrum, in 95 percent ethanol or in 0.1 percent ethanolic hydrogen chloride, shows the following characteristic bands (frequencies expressed in m$\mu$): $\lambda_{max.}$ at 273–274 ($\epsilon$=9740), 298–302 ($\epsilon$=4820) and 310 ($\epsilon$=4240, shoulder), and $\lambda_{min.}$ at 243–245 ($\epsilon$=2700) and 293–295 ($\epsilon$=4700); the ultraviolet absorption spectrum, in 0.1 percent ethanolic potassium hydroxide, shows $\lambda_{max.}$ at 268–269 ($\epsilon$=6700), 272 ($\epsilon$=6510, shoulder), 274–275 ($\epsilon$=6270) and 325–327 ($\epsilon$=5100), and $\lambda_{min.}$ at 255 ($\epsilon$=4610) and 291–293 ($\epsilon$=60). The infrared absorption spectrum taken in a suspension in Nujol, a hydrocarbon oil, shows the following characteristic bands (frequencies expressed in reciprocal centimeters): strong bands at 3140 (broad), 2850–2950 and 1460; medium bands at 1376, 1346, 1250, 1230, 1197, 1154, 1050, 1030, 925, 810 and 720; weak bands at 1630, 1588, 1567, 1088, 976, 952, 897, 885, 856 and 842; shoulders at 1415, 1290 and 1174.

In the paper chromatographic assay the new substance has the following R$f$-values on Whatman No. 1 paper: in the system ethyl acetate:tertiary butanol:water (4:2:1), R$f$=0.21; in the system tertiary butanol:toluene:water (3:1:1), R$f$=0.15–0.17.

The new compound has a strong hypotensive effect with a prolonged duration. It can be used as a hypotensive agent in animal experiments, for example, to study the reversal effects of hypertensive agents in animals having a lowered blood pressure, or it may be used as a medicament in cases of hypertension. For therapeutic use the new hypotensive compound may be made up into pharmaceutical compositions which comprise the new crystalline alkaloidal substance in substantially pure form, i.e. free from plant materials of Hunteria species, together with a pharmaceutical adjuvant as a carrier. The compositions provided by the invention may be in any suitable solid or liquid dosage form, especially in a form suitable for oral or parenteral administration, e.g. tablets, powder, capsules, pills, solutions, emulsions or suspensions, for example in the form of ampouled injectable solutions. As pharmaceutical carriers there may be employed materials or mixtures of such which do not react with the crystalline alkaloidal substance and are therapeutically useful. Substances or mixtures thereof, such as water, gelatine, lactose, starch, magnesium stearate, talc, vegetable oils, benzyl alcohol, ascorbic acid, gums, glycols such as propylene glycol or polyalkylene glycol, petroleum jelly, tragacanth, alcohol or others, may be employed. The compositions may be sterilized and may contain auxiliary substances such as preservative, stabilizing, wetting or emulsifying substances, salts for the control of the osmotic pressure or buffer substances or besides pure new compound other therapeutically active substances. In preparing the novel compositions the pure, crystalline alkaloidal substance may be admixed with the pharmaceutical carrier and formulated in the desired dosage unit form according to pharmaceutical practice. These compositions contain per dosage unit a therapeutically useful amount of the new compound, advantageously from about 0.05 to about 100 mg. and especially from about 0.1 to about 50 mg.

In contrast to any heterogenous and crude preparations from plants of the Hunteria species, the present invention provides many advantages with compositions made up from the pure, crystalline alkaloidal substance obtained according to the invention. The exact amount of the dose to produce a certain effect can be indicated. In addition, the effect and the potency of such compositions are uniform and unvarying. The new compound, being a substantially pure crystalline alkaloidal substance, lends itself to the preparation of solutions, which can be administered parenterally, for example, intravenously, which is not possible with the whole plant material and any crude extracts thereof. The pure new compound may also be a valuable intermediate for the preparation of substances, which contain instead of an ionic chlorine atom anions of other acids as hereinbelow indicated.

The process for the preparation of the new hypotensive compound of this invention comprises treating the plant material of a Hunteria species or an extract thereof with a solvent mixture containing at least one solvent of an equal to or higher dielectric constant than water and at least one organic solvent of a substantially lower dielectric constant than water, isolating the new compound from the extract resulting from the solution containing the solvent of an equal to or higher dielectric constant than water and crystallizing the new compound.

In the above defined solvent mixture a solvent of an equal or higher dielectric constant than water is particularly water ($\epsilon$=81.5 at 16° C.); furthermore, formamide ($\epsilon$=109.5 at 20° C.) and N-methyl-formamide ($\epsilon$=190 at 20°) may be used. A solvent of a substantially lower dielectric constant is particularly a lower alkanol, e.g. methanol ($\epsilon$=32.63 at 25° C.), ethanol ($\epsilon$=24.30 at 25°), n-propanol ($\epsilon$=20.1 at 25°), isopropanol ($\epsilon$=18.3 at 25°), n-butanol ($\epsilon$=17.1 at 25°), isobutanol ($\epsilon$=18.7 at 20°), secondary butanol ($\epsilon$=15.8 at 25° C.), tertiary butanol ($\epsilon$=11.4 at 19°), n-pentanol ($\epsilon$=13.9 at 25° C.) or isopentanol ($\epsilon$=14.7 at 25° C.); or a di-lower alkyl ketone, e.g. acetone ($\epsilon$=20.70 at 25° C.) or methyl ethyl ketone ($\epsilon$=18.51 at 20° C.); an aliphatic hydrocarbon, e.g. hexane ($\epsilon$=1.89 at 20° C.); a halogenated lower aliphatic hydrocarbon, e.g. methylene chloride ($\epsilon$=9.08 at 20° C.), chloroform ($\epsilon$=4.80 at 20° C.), ethylene chloride ($\epsilon$=10.36 at 25° C.), 1,1,1-trichloroethane ($\epsilon$=7.52 at 20° C.) or 1,1,2,2-tetrachloroethane ($\epsilon=8.20$ at 20° C.); an aromatic hydrocarbon, e.g. benzene ($\epsilon=2.28$ at 20° C.), toluene ($\epsilon=2.38$ at 20° C.) or xylene ($\epsilon=2.27$ to 2.57 at 20°, depending on the relative positions of the methyl groups); a lower alkyl ether, e.g. diethylether ($\epsilon=4.33$ at 20° C.); a lower alkanoic acid, e.g. formic acid ($\epsilon=58.5$ at 16° C.), acetic acid ($\epsilon=6.15$ at 20° C.) or propionic acid ($\epsilon=3.44$ at 40° C.); a lower alkyl ester of a lower alkanoic acid, e.g. ethyl formate ($\epsilon=7.16$ at 25° C.), methyl acetate ($\epsilon=6.68$ at 25° C.) or ethyl acetate ($\epsilon=6.02$ at 25° C.); or a tertiary organic base, e.g. pyridine ($\epsilon=12.3$ at 25° C.).

According to the process of this invention the solvent mixture used in the isolation step of the active alkaloidal compound from plant material or from an extract thereof may form a one-phase solvent system comprising one member of each of the above-mentioned groups; for example, a mixture of water and acetone may be employed.

However it may be of advantage to use a two-phase solvent system comprising one solvent of an equal or higher dielectric constant than water, a water-miscible solvent of a substantially lower dielectric constant than water and a sparingly water-miscible solvent of a substantially lower dielectric constant than water. For example, water may be used in admixture with (a) a water-miscible lower alkanol, di-lower alkyl ketone, a lower alkanoic acid or an organic base, and (b) a sparingly water-miscible lower alkanol, di-lower alkyl ketone, aliphatic hydrocarbon, halogenated aliphatic lower hydrocarbon or lower alkyl ester of a lower alkanoic acid; examples of the solvents in these combinations are those mentioned hereinabove. In particular, the new hypotensive alkaloidal substance may therefore be isolated from the plant material or an extract thereof by using a mixture of water, a water-miscible solvent and a sparingly water-miscible solvent. Illustrating such solvent systems are for example, combinations of water:water-miscible lower alcohol:aromatic hydrocarbon, e.g. water:methanol, ethanol or tertiary butanol:benzene or toluene; water:water-miscible lower alkanol:sparingly water-miscible di-lower alkyl ketone, e.g. water:methanol, ethanol or tertiary butanol:methyl ethyl ketone; water:water-miscible lower alkanol:halogenated aliphatic lower hydrocarbon, e.g. water:methanol, ethanol, or tertiary butanol:methylene chloride, chloroform, ethylene chloride, trichloroethane or tetrachloroethane; water:water-miscible lower alkanol:lower alkyl ester of lower alkanoic acid, e.g. water:methanol, ethanol or tertiary butanol:ethyl acetate; water:water-miscible lower alkanoic acid:halogenated lower aliphatic hydrocarbon, e.g. water:formic acid or acetic acid:methylene chloride, chloroform, ethylene chloride, trichloroethane or tetrachloroethane; water:water-miscible organic base:lower alkyl ester of lower alkanoic acid, e.g. water:pyridine:ethyl acetate, or any similar combination. The proportions of the solvents in the solvent mixture depends largely on physico-chemical characteristics of the solvents, e.g. solubility, etc.

The isolation of the active fraction may be carried out by using a process which is generally known as "distribution chromatography," a process, which may be carried out in the absence or in the presence of an adsorbent. For example, the plant material or an extract thereof may be distributed in one of the mentioned solvent mixtures and the desired product may be isolated from the separated fraction containing the solvent of a high dielectric constant, particularly the aqueous fraction. This modification is preferably carried out with a two-phase solvent system containing, for example, water, a water-miscible solvent and a sparingly water-miscible solvent, and the separated aqueous layer is then worked up to isolate the hypotensive compound. This process may be modified by extracting or dissolving the plant material or an extract thereof in one phase of the solvent system and extracting the resulting solution with the second solvent phase, if desired, after filtration and/or adsorption on an adsorbent. It may also be carried out as a countercurrent distribution, in which one phase of the solvent system, for example, the one containing the solvent of high dielectric constant, e.g. water, is moved in stages through the second phase of the solvent system, and the desired compound is thereby enriched in the phase containing the solvent of a high dielectric constant, e.g. the aqueous phase.

The above extraction may also be carried out in the presence of an adsorbent, either suited for the adsorption of the plant material or the extract thereof or for the immobilization of one of the solvents or solvent systems. As adsorbents the following materials may be employed: cellulose or cellulose acetate, starch, talc, charcoal, diatomaceous earth, such as Celite, magnesia-silica gel adsorbents, such as Florex or Florisil; silicic acid and the like; aluminum oxide, particularly neutral or acid washed aluminum oxide may be used. An adsorbent may also take over in one of the above described two-phase solvent systems the function of one of the solvent phases. For example, cellulose may be used in a one phase solvent system containing a solvent of a dielectric constant equal to or higher than water, e.g. water, and a water-miscible solvent of a substantially lower dielectric constant than water, for example, a lower alkanol, e.g. methanol; or acetone. An increasing amount of the high-dielectric constant solvent, e.g. water, may be used to enrich the content of the active compound.

The active substance is isolated from the resulting fraction which contains the solvent of the dielectric constant equal to or higher than water, e.g. the aqueous fraction, for example, by removal of the solvent, if desired, under reduced pressure and/or at an elevated temperature, and crystallization of the residue. The latter step may be carried out by using one of the above-mentioned adsorbents to remove remaining impurities. For example, a diluted aqueous solution may be treated with charcoal and a purified crystalline material may be obtained after filtration. The crystallization may be carried out from a lower alkanol, e.g. methanol or preferably ethanol, or from a di-lower alkyl ketone, e.g. acetone, if desired, with the addition of water, and/or heating and subsequent cooling. Or, the isolated extract may be treated with the aqueous solution of a base, e.g. sodium hydroxide or ammonia, and the solution may be neutralized or acidified with dilute hydrochloric acid, whereupon the active material may be precipitated and crystallized as outlined hereinabove.

The crystalline hypotensive compound may be further purified by recrystallization, for example, from ethanol or acetone or aqueous mixtures of such solvents.

As starting material in the above extraction the plant material, especially material from the bark, e.g. stem bark, of a Hunteria species, particularly from *Hunteria eburnea*, may be used; however, it may be of advantage to prepare an extract from the plant material prior to treatment with the solvent system used for the isolation of the crystalline material. Extracts may be obtained by treating the plant material with a water-miscible solvent, an aqueous mixture of such solvent or with water itself. Especially suitable are alcoholic solvents or aqueous mixtures thereof, for example, water-miscible lower alkanols, particularly methanol, or aqueous methanol. Furthermore, the plant material may be extracted with the aqueous solution of a lower alkanoic acid, e.g. acetic acid or particularly an aqueous solution thereof. Water may be used in place of these organic solvents to extract the plant material. An extract may be obtained by batch-extraction, i.e. by treating the plant material with several batches of solvent and combining the separated batches or the resulting extracts. Or, the extraction may be continuous, i.e. by continuously adding and separating the solvent. A third type of extraction consists in continuously recycling the solvent, which may be conveniently carried out in a so-called percolator; the desired fraction is thereby enriched in a relatively small amount of solvent.

A resulting extract may be used directly in the isolation procedure, or additional separation and/or purification prior to the isolation step may be desirable.

For example, an extract formed by treating the plant material with a lower alkanol, e.g. methanol, or an aqueous mixture thereof, may be treated with water, if necessary, with heating, and the aqueous solution may then be extracted with sparingly water-miscible solvents to remove undesired material, such as fatty parts. Such sparingly water-soluble solvents are, for example, halogenated hydrocarbons, e.g. methylene chloride, chloroform or ethylene chloride; sparingly water-miscible lower alkanols, e.g. normal or secondary butanol; ester-type solvents, e.g. ethyl acetate; or sparingly water-miscible ketones, e.g. methyl ethyl ketone. Or, an extract obtained with a lower alkanol may be treated with the aqueous solution of a lower alkanoic acid, e.g. acetic acid, and such an acid extract may then be washed as described above with one of the sparingly water-miscible solvents. Other extracts of plant material, for example, an acid, e.g. dilute acetic acid, extract or a water extract may be treated likewise. After treatment with sparingly water-miscible solvents, the resulting aqueous extract may be filtered to remove any insoluble material, and the solvent may, if desired, be removed from the filtrate by evaporation.

Another purification step to eliminate impurities, which may be carried out prior to the isolation process, comprises the formation of an insoluble or sparingly soluble salt, separation of such salt and disintegration thereof to form a fraction containing an increased amount of the desired product. Insoluble or sparingly soluble salts are particularly insoluble in organic solvents, such as lower alkanols, e.g. methanol or ethanol; hydrocarbons, e.g. hexane, benzene, toluene or xylene; halogenated hydrocarbons, e.g. methylene chloride, chloroform or ethylene chloride; ketones, e.g. acetone or methyl ethyl ketone; esters, e.g. ethyl acetate; lower alkanoic acids, e.g. acetic acid; or in aqueous mixtures of the above-mentioned water-miscible solvents; or in water. Salts having such properties are, for example, those with acidic organic nitro compounds, organic sulfonic acids, metal complex acids or certain inorganic acids, particularly strong inorganic acids. The salts may be formed by treating an extract containing the desired compound with a reagent capable of forming a sparingly soluble salt, such as a sparingly soluble salt-forming acid, or, more conveniently, with a salt of such acid. If the free acid is used, the extract may be used in solution with a neutral solvent, such as a lower alkanol, e.g. methanol; a ketone, e.g. acetone, or in an aqueous mixture of these solvents or in water. If the salts of the acids are employed, an acid solution of the extract is used; lower alkanoic acids, e.g. formic, acetic acid or propionic acid, or an aqueous mixture thereof are preferred.

Reagents forming insoluble or sparingly soluble salts are particularly alkali metal, e.g. lithium, sodium or potassium, or ammonium salts of acidic organic nitro compounds, e.g. the picrates or picrolonates; of organic sulfonic acids, e.g. the helianthates or flavianates; of metal complex acids, e.g. the Reineckates, phosphotungstates, phosphomolybdates, molybdates, chloroplatinates or mercuri iodates; or of certain inorganic acids, e.g., the thiocyanates, perchlorates, nitrates or sulfates, or the corresponding acids of these salts or other salts yielding the desired insoluble salts, e.g. platinous chloride.

A resulting insoluble or sparingly soluble salt, which precipitates due to its low solubility, is removed from the liquid phase, for example, by filtration and, if desired, dried. The separated salt may be disintegrated, advantageously by treatment with an adsorbing reagent, particularly a base liberating adsorbent, for example, aluminum oxide (activity II or III according to Brockmann), or with an anion exchange resin, for example, a strongly basic amine-type anion exchange resin, e.g. Amberlite IRA 400, Amberlite IRA 410, Amberlite IR 45, or Dowex 1 or Dowex 2. The resulting material may be separated from the adsorbing reagent by washing the adsorbent with a water-miscible solvent, such as a lower alkanol, e.g. methanol; a ketone, e.g. acetone; or an aqueous mixture of such solvents or with water itself.

A third possibility to purify an extract in order to obtain a fraction, which contains an increased amount of the desired hypotensive compound, comprises treating an aqueous solution of an extract obtained from the plant material or of one of the extracts purified according to the above-mentioned procedures, with an inorganic base, separating the resulting precipitate and isolating the active fraction from the aqueous phase according to the isolation procedure, or, if desired, purifying further the aqueous phase according to one of the above-mentioned purification procedures. The treatment of an aqueous solution with the inorganic base is advantageously carried out in the absence of any sparingly water-miscible solvent, such as a hydrocarbon, a halogenated hydrocarbon or an ester, which may be present from a previous operation; such solvents may be removed from the aqueous solution, for example, by ventilation with nitrogen. An aqueous solution of an extract is particularly a water solution or an aqueous organic acid, such as an alkanoic acid, e.g. acetic acid, solution. The inorganic base, for example, an alkali metal hydroxide, particularly lithium hydroxide or sodium hydroxide, or ammonia, is added, if desired, in an aqueous solution, to the agitated neutral or acidic solution of the extract to a pH of about 8. The resulting precipitate is removed from the liquid phase, for example, by filtration, and may be recycled to one of the extraction and purification procedures, if desired, after washing with water. The aqueous filtrate or the residue obtained therefrom may be used in the isolation step, for example, after neutralizing and/or removing all or part of the solvent, or it may be further purified according to one of the previously described processes, for example, by way of a sparingly soluble salt.

An additional purification, which may be applied prior to or after the isolation procedure, comprises electrophoresis or electrodialysis of an extract from plant material or of a purified fraction. For example, electrophoresis may be carried out in an ionic solvent, for example, by using as an electrolyte a water solution containing a lower alkanoic acid, e.g. acetic acid, which may be buffered with an alkali metal or an ammonium salt of such an acid, e.g. sodium acetate or ammonium acetate, or which may be in mixture with an organic tertiary base, such as pyridine. Other electrolytes may also be aqueous buffer solutions or aqueous inorganic salt solutions, for example aqueous solutions of alkali metal acetates, e.g. sodium acetate, and of alkali metal halides, e.g. sodium chloride, and the like. As a supporting medium filter paper of various thickness or a carrier made of cellulose powder or any other inert supporting material may be used. Direct current preferably from about 100 to about 1100 volts, is employed, whereby the current density depends on the concentration of the solution.

One, several or all of these separation or purification steps may be carried out prior to or after the isolation procedure; the order, in which they are employed depends on the type of extract and the purification steps selected.

Due to the fact that the new hypotensive alkaloidal substance of this invention contains an ionic chlorine atom this chlorine anion may be exchanged for another anion. For example, reaction with a strong base such as an alkali metal hydroxide, e.g. sodium or potassium hydroxide, and subsequent treatment with an acid, for example, with an inorganic acid, such as, a hydrohalic acid, e.g. hydrochloric, hydrobromic or hydroiodic acid;

perchloric, nitric or thiocyanic acid; or sulfuric or phosphoric acids; or with an organic acid, such as, acetic, maleic, tartaric, citric, benzoic, cinnamic, methane sulfonic, p-toluene sulfonic or the like may result in the formation of compounds, in which the ionic chlorine is replaced by the anion of one of the above-mentioned acids.

The following examples illustrate the invention; they are not to be construed as limitations thereon. Temperatures are given in degrees centigrade.

*Example 1*

500 g. of grounded stem bark material of *Hunteria eburnea* is percolated with 7000 ml. of methanol. The methanol is evaporated under reduced pressure at a bath temperature of from about 35° to about 40°. The resulting residue is distributed between water and methylene chloride; the separated water layer is extracted four times with methylene chloride and the separated methylene chloride portion is washed four times with water.

The combined aqueous extracts are concentrated to a volume of about 200 ml., to which is added an aqueous solution of lithium picrate (an equivalent of 1.5 g. of picric acid) while stirring vigorously. After an additional 1½ hours of stirring the resulting precipitate is collected by filtration yielding 5.23 g. of wet material, which is not worked up any further. To the stirred filtrate is added an additional 250 ml. of an aqueous lithium picrate solution (an equivalent of 1.5 g. of picric acid) while stirring vigorously. After an additional 1½ hours of stirring the resulting precipitate is collected by filtration yielding 5.23 g. of wet material, which is not worked up any further. To the stirred filtrate is added an additional 250 ml. of an aqueous lithium picrate solution (an equivalent of 25 g. of picric acid), and after 45 minutes the precipitate is collected and dried. The thus obtained picrate-precipitate is filtered through an amine-type anion exchange resin (Amberlite IRA-400), in the chloride form using an aqueous mixture of methanol and acetone; 11.82 g. of dried material is obtained from the filtrate.

This purification step is repeated with additional root material and the combined extract is processed according to the following procedure: A suspension of 3750 g. of cellulose powder (Whatman standard grade) in acetone is packed into a chromatography column, and then washed with acetone containing 10 percent water and 1 g. of 8-hydroxy-quinoline to remove impurities, such as traces of metal etc. The column is charged with a solution of 24.6 g. of the extract, prepared according to the previously given procedure, in acetone containing 13 percent water. The column is washed with acetone containing 10 percent of water at a flow rate of 150 ml. of solvent per hour. Continuous fractions of about 200 to 500 ml. are worked up separately, by evaporating to dryness and weighing the residue. A total of 13,000 ml. of solvent remove 10.6 g. of solid material. The subsequent fractions, totaling 3400 ml. of solvent, yield 2.8 g. of a solid residue having a strong hypotensive activity. The column is further developed by washing with 11000 ml. of acetone containing 15 percent water, yielding 7.3 g. of solid material, and subsequently with 9000 ml. of acetone containing 20 percent of water, yielding 1.4 g. of solid material. A total of 22.1 g. out of 24.6 g. charged to the column is recovered.

The strongly hypotensive fractions totaling 2.8 g. of solid material, are separately dissolved in warm ethanol; each fraction yields upon cooling a precipitate, which is combined with the crystalline material of the other fractions. A total of 0.150 g. of crystalline material is recovered, which is recrystallized twice from ethanol containing about 30 percent of water, yielding 0.060 g. of the pure crystalline material designated as SU–5675, having a high degree of hypotensive activity. It melts at 335–337° (with decomposition) and analyzes for an empirical formula of $C_{20-21}H_{25-29}O_{2-3}N_2Cl$. The new compound is soluble in 5 percent aqueous acetic acid, dilute aqueous sodium hydroxide, dilute aqueous ammonium hydroxide and in dilute sodium hydrogen carbonate; partly soluble in hot water; somewhat less in methanol; and only slightly soluble in ethanol and dilute aqueous hydrochloric acid.

The following ultraviolet absorption bands are characteristic for the new compound (frequencies expressed in m$\mu$): $\lambda_{max.}$ at 273–274 ($\epsilon$=9740); 298–302 ($\epsilon$=4820) and 310 ($\epsilon$=4240, shoulder), and $\lambda_{min}$ at 243–245 ($\epsilon$=2700) and 293–295 ($\epsilon$=4700) in 95 percent ethanol or in 0.1 percent ethanolic hydrogen chloride; $\lambda_{max.}$ at 268–269 ($\epsilon$=6700), 272 ($\epsilon$=6510, shoulder), 274–275 ($\epsilon$=6270) and 325–327 ($\epsilon$=5100), and $\lambda_{min.}$ at 255 ($\epsilon$=4610) and 291–293 ($\epsilon$=60) in 0.1 percent ethanolic potassium hydroxide. The following infrared absorption bands are exhibited by a suspension of the new compound in Nujol, a hydrocarbon oil (frequencies expressed in reciprocal centimeters): strong bands at 3140 (broad), 2850–2950 and 1460; medium bands at 1376, 1346, 1250, 1230, 1197, 1154, 1050, 1030, 925, 810 and 720; weak bands at 1630, 1588, 1567, 1088, 976, 952, 897, 885, 856 and 842; shoulders at 1415, 1290 and 1174.

In the paper chromatographic assay the new substance has the following R$f$–values on (Whatman No. 1 paper): R$f$=0.21 in ethylacetate:tertiary butanol:water (4:2:1), and R$f$=0.15–0.17 in tertiary butanol:toluene:water (3:1:1).

A solution of the pure compound in dilute aqueous nitric acid yields upon addition of silver nitrate an insoluble precipitate of silver chloride.

*Example 2*

5856 g. of dried and ground stem bark of *Hunteria eburnea* is extracted in a percolater, characterized by continuous recyclization of the solvent, with the following portions of solvent, each portion being used for 2 to 3 hours: 4 portions of about 20,000 ml. each of cold methanol, 8 portions of about 20,000 ml. each of methanol of 50°, one portion of about 20,000 ml. of methanol containing 10 percent water, one portion of about 20,000 ml. of methanol containing 20 per cent water and one portion of about 20,000 ml. of methanol containing about 30 percent of water. Portions 1, 2, 3, 4 and 15 are worked up separately, portions 5, 6 and 7; 8, 9, 10, 11 and 12, as well as 13 and 14 are combined; the single fractions and the three combined fractions are worked up separately, according to the same procedure.

For example, the extract obtained after removal of the solvent from the combined portions 5, 6 and 7 yields a total of 187 g. of tarry material (not dried), which is dissolved in a mixture of about 1000 ml. of 10 percent aqueous acetic acid and about 500 ml. of methylene chloride. The separated aqueous layer is extracted three times with portions of 500 ml. of methylene chloride and is then filtered through a filter of diatomaceous earth (Celite). The filtrate is made alkaline to pH 8 with a saturated aqueous solution of lithium hydroxide, the precipitate is collected and dried to yield 48.5 g. of solid material (a total of 209.0 g. of this solid material is obtained by working up the original 15 extraction fractions).

The resulting filtrate is extracted with about 1500 ml. of methylene chloride, the organic solution is dried over sodium sulfate and evaporated to dryness to yield 1.15 g. of basic material (or a total of 13.9 g. over the whole experiment).

The aqueous layer is acidified to pH 6 with glacial acetic acid and the remaining methylene chloride removed by ventilation with nitrogen gas. 300 ml. of an aqueous solution of lithium picrate (containing an equivalent of ten percent picric acid) is slowly added while stirring rapidly. A yellow precipitate is formed, filtered off, washed with water and dried to yield 33.1 g. of solid material (a total of 194.6 g. over the entire experiment). It is disintegrated on an amine-type anion exchange resin and then purified by adsorption on cellulose powder as described in Example 1 to yield the pure hypotensive compound, described in Example 1.

What is claimed is:
1. In the process for the preparation of the new crystalline product of manufacture, said product having hypotensive activity and being substantially free from plant material of Hunteria species, analyzing for the empirical formula: $C_{20-21}H_{25-29}O_{2-3}N_2Cl$, being characterized by the presence of an ionic chlorine atom; a melting point of 335–337° C. ±5° C. (with decomposition); an ultraviolet absorption spectrum in 95 percent ethanol and in 0.1 percent ethanolic hydrogen chloride, with frequencies expressed in m$\mu$: $\lambda_{max.}$ at 273–274 ($\epsilon$=9740), 298–302 ($\epsilon$=4820) and 310 ($\epsilon$=4240, shoulder), and $\lambda_{min.}$ at 243–245 ($\epsilon$=2700) and 293–295 ($\epsilon$=4700); an ultraviolet absorption spectrum in 0.1 percent ethanolic potassium hydroxide (frequencies expressed in mu): $\lambda_{max.}$ at 268–269 ($\epsilon$=6700), 272 ($\epsilon$=6510, shoulder) 274–275 ($\epsilon$=6270) and 325–327 ($\epsilon$=5100), and $\lambda_{min.}$ at 255 ($\epsilon$=4610) and 291–293 ($\epsilon$=60); and infrared absorption spectrum in a hydrocarbon oil, with frequencies expressed in reciprocal centimeters: strong bands at 3140 (broad), 2850–2950 and 1460; medium bands at 1376 1346, 1250, 1230, 1197, 1154, 1050, 1030, 925, 810 and 720; weak bands at 1630, 1588, 1567, 1088, 976, 952, 897, 885, 856 and 842; shoulders at 1415, 1290 and 1174; an R$f$=0.21 in ethyl acetate:tertiary:butanol:water (4:2:1), and an R$f$=0.15–0.17 in tertiary butanol:toluene:water (3:1:1); being soluble in 5 percent aqueous acetic acid, dilue aqueous sodium hydroxide, dilute aqueous ammonium hydroxide, dilute aqueous sodium hydrogen carbonate; partly soluble in hot water and methanol, sparingly soluble in ethanol and dilute aqueous hydrochloric acid, the steps which comprise extracting plant material of a Hunteria species with a solvent selected from the group consisting of water, lower alkanol, aqueous lower alkanol and aqueous lower alkanoic acid, converting the resulting extract into the insoluble picrate salt by treatment with a member of the group consisting of picric acid, the ammonium and alkali metal salts thereof, separating said salt by filtration, disintegrating said separated salt on an ion exchange resin to form the free compound, treating said free compound with a one-phase solvent system containing water and a water-miscible solvent of a substantially lower dielectric constant than water in the presence of an adsorbent, isolating the desired compound from the aqueous extract by removing the solvent and crystallizing it from a member of the group consisting of lower alkanol, acetone and aqueous mixtures of these solvents.

2. Process according to claim 1, wherein plant material of *Hunteria eburnea* is extracted with methanol.

3. Process according to claim 1, wherein lithium picrate is used.

4. Process according to claim 1, wherein cellulose is used as the adsorbent.

5. Process according to claim 1, wherein the desired compound is recrystallized from aqueous ethanol.

References Cited in the file of this patent

UNITED STATES PATENTS 2,823,204  Janot _____ Feb. 11, 1958

OTHER REFERENCES

Raymond Hamet: Compt. Rend., vol. 240, pp. 1470–1475, March 1955.

Raymond Hamet: Compt. Rend., vol. 243 (1956), pp. 2175–2178.

Raymond Hamet: Compt. Rend., vol. 244 (1957), pp. 2991–2993.

Samuelsson: Farmaceut, Rev., vol. 50 (1951) pp. 229–240,

UNITED STATES PATENT OFFICE
CERTIFICATION OF CORRECTION

Patent No. 2,963,475                        December 6, 1960

Merrill Frederick Bartlett et al.

It is hereby certified that error appears in the above numbered patent requiring correction and that the said Letters Patent should read as corrected below.

Column 9, line 26, for "1376    1346," read -- 1376, 1346, --; line 30, for "tertiary:butanol" read -- tertiary butanol --.

Signed and sealed this 25th day of July 1961.

(SEAL)
Attest:

ERNEST W. SWIDER                           DAVID L. LADD
Attesting Officer                              Commissioner of Patents